US010686733B2

(12) United States Patent
Liu

(10) Patent No.: US 10,686,733 B2
(45) Date of Patent: Jun. 16, 2020

(54) SYSTEM AND METHOD FOR VIRTUAL MACHINE ADDRESS ASSOCIATION

(71) Applicant: Hewlett Packard Enterprise Development LP, Houston, TX (US)

(72) Inventor: Xinmin Liu, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/325,147

(22) PCT Filed: Jul. 13, 2015

(86) PCT No.: PCT/CN2015/083867
§ 371 (c)(1),
(2) Date: Jan. 10, 2017

(87) PCT Pub. No.: WO2016/008394
PCT Pub. Date: Jan. 21, 2016

(65) Prior Publication Data
US 2017/0180274 A1 Jun. 22, 2017

(30) Foreign Application Priority Data

Jul. 14, 2014 (CN) .......................... 2014 1 0332388

(51) Int. Cl.
H04W 72/04 (2009.01)
H04L 12/931 (2013.01)
(Continued)

(52) U.S. Cl.
CPC .......... H04L 49/70 (2013.01); H04L 12/4641 (2013.01); H04L 12/6418 (2013.01);
(Continued)

(58) Field of Classification Search
CPC ........ H04L 45/586; H04L 45/38; H04L 49/70
See application file for complete search history.

(56) References Cited

U.S. PATENT DOCUMENTS 9,667,541 B2 * 5/2017 Song ..................... H04L 45/745
2009/0083445 A1 3/2009 Ganga
(Continued)

FOREIGN PATENT DOCUMENTS

CN 101667144 A 3/2010
CN 101902395 A 12/2010
(Continued)

OTHER PUBLICATIONS

Ole J. Jacobsen, Editor and Publisher: Software-Defined Networks and OpenFlow, The Internet Protocol Journal, vol. 16, No. 1, p. 2-13.*

(Continued)

Primary Examiner — Sulaiman Nooristany
(74) Attorney, Agent, or Firm — Park, Vaughan, Fleming & Dowler LLP

(57) ABSTRACT

Various examples of the present disclosure may provide a packet processing method. A control device may receive a packet from an access switch. If VM address information in the packet is not associated with a port on the access switch for receiving the packet, the control device may send an instruction to the access switch instructing the access switch to associate the VM address information with the port on the access switch for receiving the packet, so that the access switch associates the VM address information with the port on the access switch for receiving the packet. The VM address information may comprise: a VLAN ID, an IP address and an MAC address.

9 Claims, 4 Drawing Sheets

(51) Int. Cl.
  *H04L 12/64* (2006.01)
  *H04L 12/46* (2006.01)
  *H04L 12/66* (2006.01)
  *H04L 12/741* (2013.01)
  *H04L 12/935* (2013.01)

(52) U.S. Cl.
  CPC .............. *H04L 12/66* (2013.01); *H04L 45/74* (2013.01); *H04L 49/30* (2013.01)

(56) References Cited

U.S. PATENT DOCUMENTS

| | | | |
|---|---|---|---|
| 2010/0214949 A1 | 8/2010 | Smith | |
| 2011/0085563 A1* | 4/2011 | Kotha | H04L 41/0816 370/401 |
| 2012/0317566 A1* | 12/2012 | Santos | H04L 45/742 718/1 |
| 2013/0034015 A1 | 2/2013 | Jaiswal et al. | |
| 2015/0043576 A1* | 2/2015 | Dixon | H04L 12/184 370/390 |
| 2015/0281067 A1* | 10/2015 | Wu | H04L 61/103 370/392 |
| 2016/0197824 A1* | 7/2016 | Lin | H04L 12/6418 370/389 |

FOREIGN PATENT DOCUMENTS

| | | | |
|---|---|---|---|
| CN | 102136931 A | 7/2011 | |
| CN | 102148749 A | 8/2011 | |
| CN | 102316001 A | 1/2012 | |
| CN | 102412978 A | 4/2012 | |
| WO | WO-2013/097067 A1 | 7/2013 | |
| WO | WO 2014111767 A1 * | 7/2014 | ......... H04L 12/4641 |

OTHER PUBLICATIONS

International Search Report and Written Opinion, International Application No. PCT/CN2015/083867, dated Oct. 12, 2015, pp. 1-8, SIPO.

* cited by examiner

SYSTEM AND METHOD FOR VIRTUAL MACHINE ADDRESS ASSOCIATION

This application claims the benefit of priority from Chinese Patent Application, No. 201410332388.5, entitled "Packet Processing Method and Device" and filed on Jul. 14, 2014, the entire content of which is hereby incorporated by reference.

BACKGROUND

With increase of data center services, user's demands keep growing. The scale and function of a data center is becoming more and more complex and it is more and more difficult to manage the data center. Therefore, as for enterprise data center, data centers should be integrated, management cost of the data center should be reduced and existing resources should be adequately mined to satisfy higher service requirements. A trend of the integration of the data center is virtualized operation of data center resources.

DETAILED DESCRIPTION

Virtualized technologies may be utilized to perform abstraction processing for physical resources and services. During the use of the physical resources and services, a person who uses the physical resources and a system administrator do not care about physical features of an object and details of service boundary, so that the usage and management of the physical resources may be simplified and the resource utilization may be improved. Therefore, the virtualized processing of the data center may improve resource utilization (such as, CPU utilization and storage capacity, etc.) of the data center, reduce energy consumption of the system, reduce design, operating, management and maintenance costs of the system and obtain integrated objects.

Most of current virtualization technologies are designed for the some servers. Virtualization programs such as, VMWare, XEN VM and a Kernel-based Virtual Machine (KVM) may support some CPU servers.

The virtual switch may be developed utilizing virtualization technologies of the some devices according to open standards such as Institute of Electrical and Electronics Engineers (IEEE) 802.1Qbg and 802.1BR, etc. Therefore, the virtual switch may cooperate with an external network device. The physical network device may obtain the migration of the VM, so that the network security strategy may be automatically followed. That is, the network security strategy may be adjusted with the migration of the VM.

Some devices, such as powerVM are completely closed. Although the virtualization of the devices is similar to that of the VMWare, XEN and KVM, at present, there is no program product to support virtualization network awareness, such as 802.1Qbg. Examples of the present disclosure may provide an automatic security control solution for the minicomputer to improve the security of the data center.

An example of the present disclosure may provide a packet processing method. When a control device receives a packet from a VM via an access switch, the control device may obtain an access location of each VM on each server according to VM address information in the received packet, so that security strategy control of the network may be adjusted and issued according to the access location.

The present disclosure may, for example, be implemented on an open server or a closed minicomputer.

Figure 1:
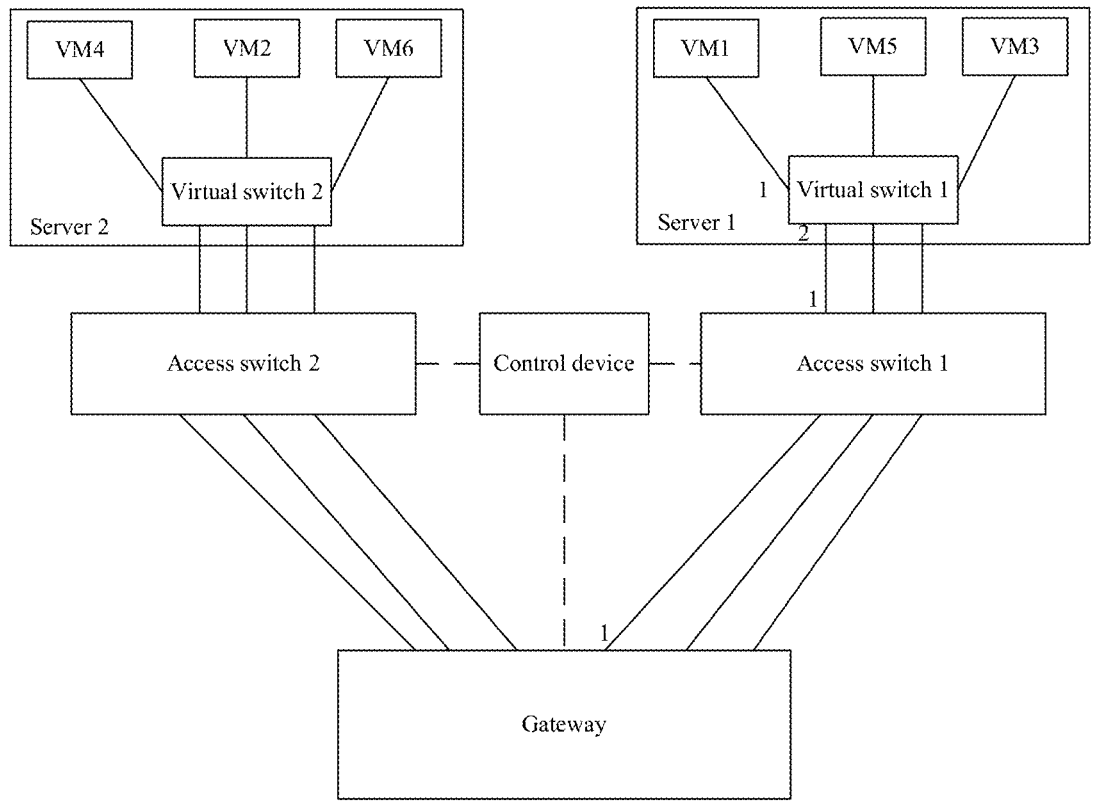
FIG. 1 is a diagram illustrating a packet processing network in accordance with various examples of the present disclosure.

FIG. 1 is a diagram illustrating a packet processing network in accordance with various examples of the present disclosure. FIG. 1 may include: two servers (i.e., server 1 and server 2) and two access switches (i.e., access switch 1 and access switch 2), a control device and a gateway. If layer 2 packet interaction is performed, the layer 2 interaction may be implemented with a new gateway. If both the layer 2 packet interaction and layer 3 packet interaction are performed, the layer 2 packet interaction and layer 3 packet interaction may be implemented with the gateway in the network or with a new gateway connecting to the gateway in the network.

Configurations of each device may be described hereinafter.

(1) Servers may be configured as following:

Multiple VMs and a virtual switch may be set on each server. A virtual network card of each VM may connect to the virtual switch. Each VM may be allocated with a different Virtual Local Area Network Identity (VLAN ID). That is, the VLAN ID allocated to each VM is unique.

When each VM is configured, an MAC address and an IP address of the each VM may be configured. After a VM is allocated with a VLAN ID, the VLAN ID, MAC address and IP address allocated to the VM may be associated and stored.

The VLAN ID allocated to the each VM may be used to identify the each VM. If a VM is configured with multiple virtual network cards, one VLAN ID, one MAC address and one IP address may be allocated to the each virtual network card.

In an example of the present disclosure, different VMs may be identified with different VLANs to make VMs isolate with each other on Layer-2. The control device may be used to control packet forwarding among the VMs. If information association between the IP address and the MAC address is used, the VMs may be located at a same VLAN, the VMs in the same VLAN may communicate with each other without the control of the control device. In an example of the present disclosure, the packet interaction between the VMs may be controlled by the control device.

Two ports on a virtual switch on a server may belong to a VLAN configured for a VM. One port of the virtual switch may connect to a virtual network card of the VM marked with the VLAN and the other port may connect to a physical network card of the server and connect to an access switch via the physical network card.

Taking the configuration of the server 1 in FIG. 1 for example, the server 1 may be configured with three VMs, i.e. VM1, VM3 and VM5 and a virtual switch 1. Each VM may be allocated with a unique VLAN ID. Taking VM1 for example, an MAC address, i.e. MAC1, an IP address, i.e. IP1 and a VLAN 1 may be allocated to the VM1. The virtual network card of the VM1 may connect to the virtual switch 1. The port 1 and port 2 of the virtual switch 1 belong to the VLAN1. The two ports, i.e. port 1 and port 2 may be used to transmit packets of the VLAN1. The virtual switch 1 may connect to the physical network card of the server 1 via the port 2.

(2) The access switch may be configured as following.

A control protocol, such as an Openflow protocol and a configuration protocol, such as a Netcinf protocol may be configured for the access switch.

A packet processing rule may be configured for the access switch at local. The packet processing rule may include: making a determination as to whether the VM address information in the packet is associated with a port on the access switch for receiving the packet and processing the packet according to information carried by the packet if the VM address information in the packet is associated with the port receiving the packet and sending the packet to the control device, so that the control device may make a determination as to whether the access switch may receive and process the packet if the VM address information in the packet is not associated with the port receiving the packet.

The packet processing rule configured for the access switch may be received from the control device. The access switch may make the packet processing rule in effective at local.

In an example of the present disclosure, in order to implement central control of the control device, the access switch may be further configured as follows: when the access switch receives an Address Resolution Protocol (ARP) request, the access switch may send the ARP request to the control device and the control device may make a response to the ARP request.

When the access switch receives a packet from the VM and the port receiving the packet is not associated with the VM address information, the access switch may send the packet to the control device. When the port receiving the packet is associated with the VM address information and the access switch does not store a Flow Table (FT), the access switch may send the packet to the control device. When the access switch does not store relevant information received from the control device for processing the packet, the access switch may send the packet to the control device and the control device may control and process the packet.

(3) The control device may be configured as following.

The MAC address, IP address and VLAN ID of each VM may be associated and stored in the control device. The VLAN ID of the each VM may be the unique. One VLAN ID may be used to identify one VM. The MAC address and IP address of the gateway and packet forwarding methods provided by the gateway may be associated and stored in the control device. The packet forwarding methods may include: a virtual port method or a super VLAN method. The gateway and the physical port of the each access switch connecting to the gateway may be associated and a relationship between the gateway and the physical port of the each access switch connecting to the gateway may be stored in the control device. If the packet forwarding method is the super VLAN method, the control device may obtain a main VLAN running on the gateway.

(4) The gateway may be used to implement the layer-2 interworking between the each VM and layer-3 forwarding of the each VM via the super VLAN method or the virtual port method.

Figure 2:
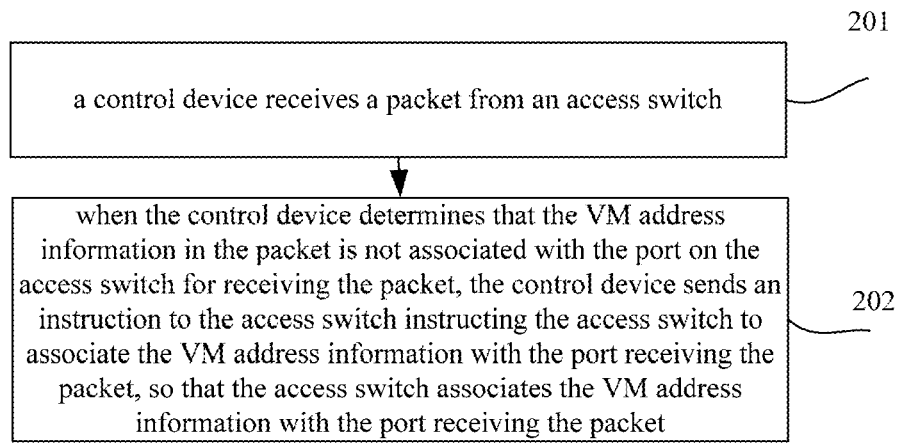
FIG. 2 is a chart illustrating a packet processing method in accordance with various examples of the present disclosure.

Referring to FIG. 2, FIG. 2 is a chart illustrating a packet processing method in accordance with various examples of the present disclosure.

At block 201, a control device may receive a packet from an access switch.

When a port receiving the packet is not associated with VM address information in the packet, information of the port receiving the packet may be sent to the control device, so that the control device may obtain that the packet may be received by which port of which access switch.

The VM address information may include: a Virtual Local Area Network Identity (VLAN ID), an Internet Protocol (IP) address and a Media Access Control (MAC) address. The IP address may be a source IP address of the packet. The MAC address may be a source MAC address of the packet. The VLAN ID may be an ID of a VLAN, to which the packet may belong.

At block 202, when the control device determines that the VM address information in the packet is not associated with the port on the access switch for receiving the packet, the control device may send an instruction to the access switch instructing the access switch to associate the VM address information with the port receiving the packet, so that the access switch may associate the VM address information with the port receiving the packet.

In an example of the present disclosure, the method for the access switch to associate the VM address information with the port receiving the packet may include: respectively associating the VM address information with an ingress port of the port receiving the packet and associating the VM address information with an egress port of the port receiving the packet.

When the control device sends the instruction to the access switch instructing the access switch to associate the VM address information with the port receiving the packet, the control device may store an association relationship between the VM address information and the port at local. That is, the control device may record information indicating that the VM address information is associated with the port. The port may be a port on the access switch for receiving the packet.

The control device may check whether the association relationship between the port and the VM address information has been stored at local to determine whether the VM address information in the packet has been associated with the port on the access switch for receiving the packet.

When the control device determines that the VM address information in the packet is not associated with the port on the access switch for receiving the packet, the control device may further make a determination as to whether the VM address information stored at local includes the VM address information in the packet. If the VM address information stored at local includes the VM address information in the packet, the control device may send an instruction to the access switch instructing the access switch to associate the VM address information in the packet with the port receiving the packet. If the VM address stored at local does not include the VM address information in the packet, the control device may send an instruction to the access switch instructing the access switch not to receive the packet. Then, the access switch may discard the packet. The access switch may further make a determination as to whether the VM is controlled by the control device and make a determination as to whether the packet is an unauthorized packet.

When the control device determines that the VM address information in the packet is associated with the port on the access switch for receiving the packet, the control device may not send any instruction instructing the access switch to associate the VM address information in the packet with the port receiving the packet.

When the control device determines that the VM address information in the packet is not associated with the port on the access switch for receiving the packet and determines that VM address information in the packet has been associated with another port before the migration of the VM (called a pre-migration port), the control device may send an instruction to another access switch (called a pre-migration access switch), at which the pre-migration port associated with the VM address information in the packet may be located, instructing the pre-migration access device to delete the association relationship. The pre-migration access device may delete the VM address information associated with the pre-migration port. The control device may further update the association relationship between the VM address information and the ports stored at local.

When the access switch receives the instruction from the control device instructing the access switch to associate the VM address information in the packet with the port receiving the packet, the access switch may respectively associate the VM address information with the an ingress port of the port and associate the VM address information with an egress port of the port. After the ingress port of the port is associated with the VM address information, a packet from the VM may be received. After the egress port of the port receiving the packet is associated with the VM address information, a packet may be sent to the VM.

Therefore, the control device not only may obtain the location of the VM, but also may control the each VM. The control device may filter out packets from other devices other than the VM controlled by the control device. After the VM is migrated, the control device may timely obtain the locations of the VM before the migration and the location of the VM after the migration.

The processing of the packet according to whether the port receiving the packet is associated with the VM address information may be described hereinbefore. The processing of the packet according to the type and contents of the packet may be described hereinafter.

For example, when the packet is a cluster packet transmitted among VMs, the control device may send the FT to the access switch and the access switch may forward the cluster packet to the gateway according to the FT.

For another example, when the packet is an ARP request, the control device may send an MAC address corresponding to an IP address of a destination end of the ARP request to the access switch and the access switch may send a response to the VM sending the ARP request via a port associated with the VM address information.

In an example of the present disclosure, when the IP address of the sending end of the ARP request is an IP address of a VM, the MAC address of the VM may be sent to the VM sending the ARP request. When the IP address of the sending end of the ARP request is the IP address of the gateway or the IP address of the sending end of the ARP request is neither the IP address nor the IP address of any VM, the MAC address of the gateway may be sent to the VM sending the ARP request.

When the control device sends the MAC address to the access switch, the control device may send the MAC address via an ARP response or a protocol packet. If the MAC address is sent via the protocol packet, the destination MAC address of the protocol packet may be the MAC address sending the ARP request, the destination IP address of the protocol packet may be the IP address sending the ARP request and the protocol packet may carry the VLAN ID allocated to the VM sending the ARP request.

For another example, when the packet is a data packet, a FT may be sent to the access switch, so that the access switch may send the data packet to the gateway according to the FT.

In an example, the gateway may provide two kinds of packet forwarding methods. The first packet forwarding method may be a super VLAN method and the second packet forwarding method may be a virtual port method. When the control device issues the FT, the control device may further perform following processing with the two kinds of packet forwarding methods.

The first packet forwarding method may be as following.

The control device may notify the gateway of creating a sub-VLAN on a physical port of the gateway and recording a corresponding relationship between the sub-VLAN and the physical port of the gateway. The VLAN ID of the sub-VLAN may be the same as the VLAN ID in the data packet.

The control device may send a primary VLAN ID, VLAN ID of the sub-VLAN and the source MAC address of the data packet to the gateway. The gateway may create an MAC address forwarding entry according to the primary VLAN ID, VLAN ID of the sub-VLAN and source MAC address of the data packet, receive the data packet and forward the data packet according to the MAC address forwarding entry. The VLAN ID of the sub-VLAN may be the same as the VLAN ID in the data packet.

If the VM is migrated and the VM has transmitted the data packet on another location before the migration, i.e., the sub-VLAN, the ID of which may be the same as the VLAN ID in the VM address information has been created, the control device may be further configured to notify the gateway of deleting the sub-VLAN, the VLAN ID of which may be the same as the VLAN ID in the VM address information and the gateway may delete the sub-VLAN created on the corresponding physical port.

When the gateway receives the MAC address, primary VLAN ID and VLAN ID of the sub-VLAN from the control device, the gateway may create the MAC address forwarding entry including the MAC address, primary VLAN ID and the VLAN ID of the sub-VLAN.

When the gateway receives the data packet, the gateway may search a local MAC address forwarding table for an MAC address forwarding entry according to a destination MAC address of the data packet and forward the data packet according to the MAC address forwarding entry. That is, the gateway may forward the data packet to the access switch via a sub-VLAN in the primary VLAN corresponding to the destination MAC address of the data packet.

If the destination MAC address of the data packet is the MAC address of the gateway, the forwarding of the data packet may be layer-3 forwarding.

The second packet forwarding method may be as following.

The control device may notify the gateway of creating a virtual port on a physical port of the gateway. The control device may record a corresponding relationship between the virtual port, physical port and VLAN ID and send the virtual port and the VLAN ID in the data packet to the gateway. The gateway may remove the VLAN ID of the data packet on the virtual port.

The control device may send a corresponding relationship between a virtual port, a Virtual Network Interface (VNI) and a source MAC address of the data packet to the gateway. The gateway may create an MAC address forwarding entry according to the virtual port, VNI and source MAC address of the data packet, receive the data packet and forward the data packet according to the MAC address forwarding entry. The virtual port may be the virtual port created on the physical port and the VNI may be the VNI, to which the virtual port may belong.

If the VM has been migrated and the VM has transmitted the data packet on another location before the migration, i.e., the virtual port corresponding to the VLAN ID in the VM address information has been created, the control device may be further configured to notify the gateway of deleting the created virtual port corresponding to the VLAN ID in the data packet. The gateway may delete the virtual port created on the physical port.

When the gateway receives the virtual port and VLAN ID from the control device, the gateway may create and store an associate relationship between the virtual port and the VLAN ID.

When the gateway receives the data packet via the virtual port, the gateway may make a determination as to whether the VLAN ID in the data packet is same as the VLAN ID associated with the virtual port. If the VLAN ID in the data packet is same as the VLAN ID associated with the virtual port, the gateway may remove the VLAN ID of the data packet and process the data packet. If the VLAN ID in the data packet is not same as the VLAN ID associated with the virtual port, the gateway may discard the data packet.

The physical port of the gateway may be a port on the gateway for receiving the data packet. When control device may send the FT to the access switch and access switch may forward the data packet to the gateway, the physical port of the gateway may be the port on the gateway for receiving the data packet.

When the gateway receives the virtual port, VNI and the source MAC address of the data packet from the control device, the gateway may create the MAC address forwarding entry according to the virtual port, VNI and the source MAC address of the data packet at local.

When the gateway receives the data packet, the gateway may remove the VLAN ID of the data packet on the virtual port, search the local MAC address forwarding table for the virtual port according to the destination MAC address of the data packet and forward the data packet to the access switch via the virtual port.

When the destination MAC address of the data packet is the MAC address of the gateway, the forwarding of the data packet may be layer-3 forwarding.

When a VM configured for a server is migrated, the processing flow may be as follows.

After the VM migrates, the learned ARP entry may be kept unchanged. When the VM sends the data packet to a destination end, the MAC address of which is not learned, as described hereinbefore, if the IP address of the destination end is configured at local, the VM may transmit the data packet with the IP address. If the IP address of the destination end is not configured at local, after the MAC address of the device is obtained via an ARP request, the data packet may be forwarded with the MAC address. When the VM sends the data packet to the destination end, the ARP entry of which has been learned, the data packet may be transmitted according to the MAC address in the ARP entry and forwarded to the access switch via a virtual switch connecting with the VM.

When the access switch receives the data packet and determines that the port receiving the data packet is not associated with the VM address information in the data packet, the access switch may send the data packet to the control device. The processing flow of the control device may be the same as that described hereinbefore.

Figure 3:
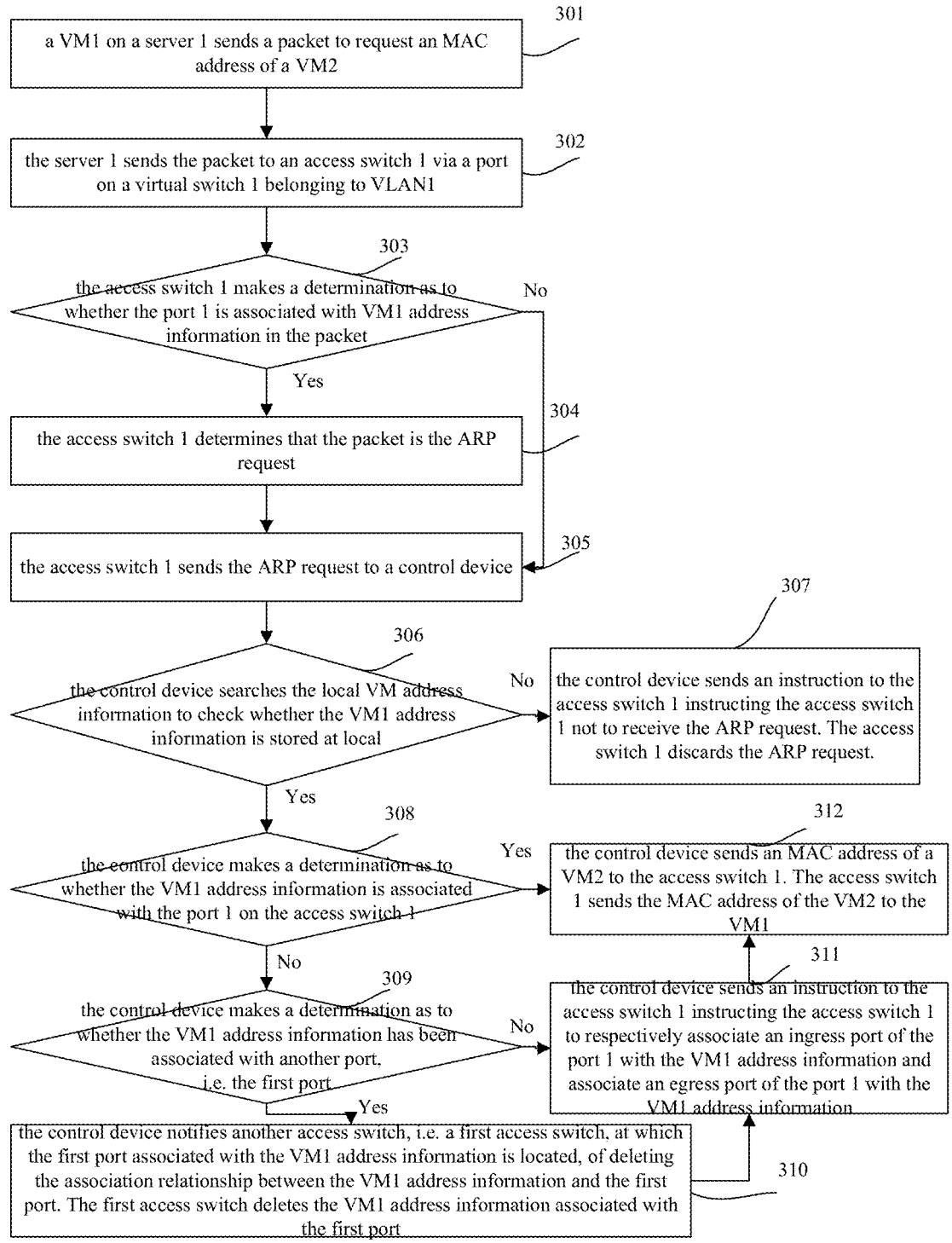
FIG. 3 is a chart illustrating a flow that a Virtual Machine 1 (VM1) requests a Media Access Control (MAC) address of VM2 in accordance with various examples of the present disclosure.

Referring to FIG. 3, FIG. 3 is a chart illustrating a flow that a Virtual Machine 1 (VM1) requests a Media Access Control (MAC) address of a VM2 in accordance with various examples of the present disclosure.

At block 301, a VM1 on a server 1 may send a packet to request an MAC address of a VM2.

When the VM1 sends a data packet to a VM2 and the VM1 does not record an MAC address of the VM2, the VM1 may send a packet to request the MAC address of the VM2. If the VM1 has recorded the MAC address of the VM2, the VM1 may send the data packet to the VM2 with the MAC address of the VM2.

A source MAC address in an L2 header of the packet may be MAC1 of the VM1 and a destination MAC address may be an all-F address (i.e., a broadcast MAC address). An IP address of a sending end in the packet may be IP1, an IP address of a destination end in the packet may be an IP address of the VM2, i.e. IP2, the MAC address of the sending end in the packet may be MAC1 and the MAC address of the destination end in the packet is an all-0 address (i.e., invalid MAC address). The packet may further carry the VLAN 1 allocated to the VM1.

In an example of the present disclosure, the VM1 may perform the layer-2 forwarding. If the VM1 performs the layer-3 forwarding, the IP address of the destination end may be the IP address of the gateway and may be used to obtain the MAC address of the gateway.

At block 302, the server 1 may send the packet to an access switch 1 via a port on a virtual switch 1 belonging to VLAN1.

At block 303, when the access switch 1 receives the packet via a port 1 on the access switch 1, the access switch 1 may make a determination as to whether the port 1 is associated with VM1 address information in the packet. If the port 1 is associated with the VM1 address information in the packet, block 304 may be executed. If the port 1 is not associated with the VM1 address information, block 305 may be executed.

At block 304, the access switch 1 may determine that the packet may be the ARP request.

At block 305, the access switch 1 may send the ARP request to a control device.

After the access switch receives the ARP request, in the following three scenarios, the ARP request may be sent to the control device.

First, the port receiving the packet may not be associated with the VM address information in the packet.

Second, the port receiving the packet may be associated with the VM address information in the packet and the packet may be the ARP request.

Third, the port receiving the packet may be associated with the VM address information in the packet, the packet may be the data packet and the FT for forwarding the packet cannot be found at local.

In an example of the present disclosure, if a packet is to be forwarded, before the packet is forwarded, the FT may be searched out to forward the packet, the packet may be the cluster packet.

When the access switch 1 sends the ARP request to the control device, the information of the port on the access switch 1 for receiving the packet may be further sent to the control device.

At block 306, when the control device receives the ARP request, the control device may search the local VM address information to check whether the VM1 address information is stored at local. If the VM1 address information is stored at local, block 308 may be executed. If the VM1 address information is not stored at local, block 307 may be executed.

At block 307, the control device may send an instruction to the access switch 1 instructing the access switch 1 not to receive the ARP request. The access switch 1 may discard the ARP request. The flow may end.

AT block 308, the control device may make a determination as to whether the VM1 address information is associated with the port 1 on the access switch 1. If the VM1 address information is associated with the port 1 on the access switch 1, block 312 may be executed. If the VM1 address information is not associated with the port 1 on the access switch 1, block 309 may be executed.

At block 309, the control device may make a determination as to whether the VM1 address information may have been associated with another port, i.e. a first port. If the VM1 address information is associated with the first port, block 310 may be executed. If the VM1 address information is not associated with the first port, block 311 may be executed.

At block 310, the control device may notify another access switch, i.e. a first access switch, at which the first port associated with the VM1 address information may be located, of deleting the association relationship between the VM1 address information and the first port. The first access switch may delete the VM1 address information associated with the first port.

At block 311, the control device may send an instruction to the access switch 1 instructing the access switch 1 to respectively associate an ingress port of the port 1 with the VM1 address information and associate an egress port of the port 1 with the VM1 address information. The access switch 1 may associate the ingress port of the port 1 with the VM1 address information and associate the egress port of the port 1 with the VM1 address information.

The control device may record the association relationship between the ingress port of the port 1 and the VM1 address information and the association relationship between the egress port of the port 1 and the VM1 address information.

At block 312, the control device may send an MAC address of a VM2 to the access switch 1. The access switch 1 may send the MAC address of the VM2 to the VM1.

In an example of the present disclosure, when the control device sends the MAC address of the VM2, i.e. MAC 2 to the access switch 1, the control device may send the MAC 2 to the access switch 1 via an ARP response. The source MAC address in L2 header of the ARP response may be the MAC 2 of the VM2 and the destination MAC address of the ARP response may be the MAC 1 of the VM1. The IP address of the sending end in the ARP response may be IP2 and the IP address of the destination end may be the IP address of the VM1, i.e. IP1. The MAC address of the sending end may be the MAC2 and the MAC address of the destination end may be the MAC1. The ARP request may further carry the VLAN 1 allocated to the VM1.

Since both the ingress port and egress port of the port 1 are associated with the VM1 address information including the IP1, VLAN 1 and MAC1. Therefore, the ARP response from the control device may be sent to the server 1 via the port 1 and then forwarded to the VM1.

Figure 4:
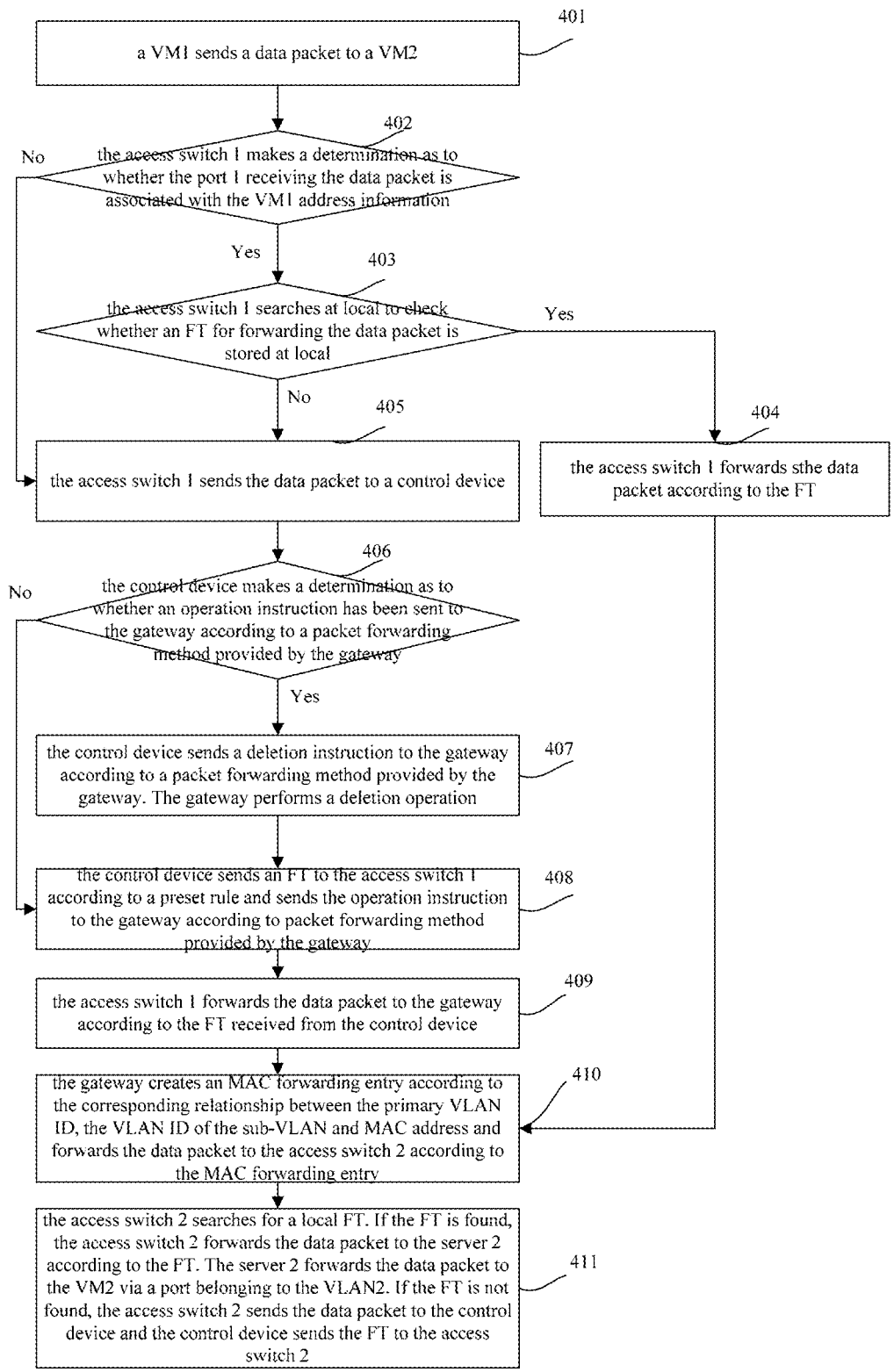
FIG. 4 is a chart illustrating a flow that the VM1 sends a data packet to the VM2 in accordance with various examples of the present disclosure.

Referring to FIG. 4, FIG. 4 is a chart illustrating a flow that the VM1 sends a data packet to the VM2 in accordance with various examples of the present disclosure.

At block 401, a VM1 may send a data packet to a VM2.

The VM1 may receive an ARP response from the access switch 1, perform ARP learning and send the data packet to the VM2 using the learned MAC2 of the VM2. If the MAC address of the VMs is configured at local, the VM1 may send the data packet to the VM2 with the local MAC address of the VM2.

At block 402, the access switch 1 may receive the data packet and make a determination as to whether the port 1 receiving the data packet is associated with the VM1 address information in the data packet. If the port 1 is associated with the VM1 address information, block 403 may be executed. If the port 1 is not associated with the VM1 address information, block 405 may be executed.

At block 403, the access switch 1 may search at local to check whether an FT for forwarding the data packet is stored at local. If the FT for forwarding the data packet is stored at local, block 404 may be executed. If the FT for forwarding the data packet is not stored at local, block 405 may be executed.

At block 404, the access switch 1 may forward the data packet according to the FT and block 410 may be executed.

At block 405, the access switch 1 may send the data packet to a control device.

At block 406, when the control device receives the data packet, the control device may make a determination as to whether an operation instruction has been sent to the gateway according to a packet forwarding method provided by the gateway. If the operation instruction has been sent to the gateway, block 407 may be executed. If no operation instruction has been sent to the gateway, block 408 may be executed.

When the control device receives the data packet, the method for making a determination as to whether the port on the control device for receiving the data packet is associated with the VM1 address information may be similar to that shown in FIG. 3.

If the operation instruction has been sent to the gateway according to a packet forwarding method provided by the gateway and a data packet is received again, a conclusion that the VM may have been migrated may be drawn. The above block 202 may describe how to send an operation instruction to the gateway.

At block 407, the control device may send a deletion instruction to the gateway according to a packet forwarding method provided by the gateway. The gateway may perform a deletion operation.

When the packet forwarding method provided by the gateway is the super VLAN method and it may be determined that the gateway has created the sub-VLAN, the ID of the which is the same as the VLAN ID in the data packet according to a local record, the control device may notify the gateway of deleting the sub-VLAN, the ID of the which is the same as the VLAN ID in the data packet.

When the packet forwarding method provided by the gateway is the virtual port method and it may be determined that the gateway has created the virtual port associated with the VLAN, the control device may notify the gateway of deleting the virtual port associated with the data packet and an association relationship between the VLAN and the virtual port.

At block 408, the control device may send an FT to the access switch 1 according to a preset rule and send the operation instruction to the gateway according to packet forwarding method provided by the gateway.

(1) When the packet forwarding method provided by the gateway is the super VLAN method, the control device may notify the gateway of creating a sub-VLAN on a physical port. The sub-VLAN may be the VLAN 1 carried by the data packet. The control device may further record creating which sub-VLAN on which port of the gateway at local.

The physical port may be a physical port used by the access switch 1 to send the data packet to the gateway according to the FT received from the control device.

The control device may send a corresponding relationship between the primary VLAN ID, VLAN ID of the sub-VLAN and MAC address, i.e. the corresponding relationship between the primary VLAN1, sub-VLAN1 and MAC1 to the gateway.

(2) When the packet forwarding method provided by the gateway is the virtual port method, the control device may notify the gateway of creating a virtual port on a physical port, send a corresponding relationship between the virtual port and the VLAN1 and the association relationship between the virtual port and the VNI to the gateway. The control device may further record creating which virtual port on which port of the gateway at local.

The physical port may be a physical port used by the access switch 1 to send the data packet to the gateway according to the FT received from the control device.

The control device may send a corresponding relationship between the MAC address, virtual port and VNI, i.e. the corresponding relationship between the MAC1, virtual port 1 and VNI1 to the gateway.

At block 409, the access switch 1 may forward the data packet to the gateway according to the FT received from the control device.

At block 410, when the gateway receives the data packet, the gateway may create an MAC forwarding entry according to the corresponding relationship between the primary VLAN ID, the VLAN ID of the sub-VLAN and MAC address and forward the data packet to the access switch 2 according to the MAC forwarding entry.

(1) When the packet forwarding method provided by the gateway is the super VLAN method, the gateway may receive the corresponding relationship between the primary VLAN ID, the VLAN ID of the sub-VLAN and MAC address from the control device and create the MAC forwarding entry of the MAC1. The VLAN ID of the sub-VLAN may be the VLAN1 in the data packet and the MAC address may be the source MAC address of the data packet, i.e. the MAC1.

When the gateway receives the data packet, the gateway may search for the MAC forwarding entry corresponding to the destination MAC address in the primary VLAN corresponding to the sub-VLAN, replace the VLAN1 in the data packet with the VLAN2 in the MAC forwarding entry and forward the data packet to the access switch 2 via a port of the VLAN2.

If the data packet sent from the VM1 should be forwarded via layer-3 forwarding, the destination MAC address may be the MAC address of the gateway and the layer-3 forwarding may be performed with the IP address.

(2) When the packet forwarding method provided by the gateway is the virtual port method, the gateway may receive the corresponding relationship between the MAC address, virtual port and VNI from the control device and create the MAC forwarding entry of the MAC address. The MAC address may be the source MAC address of the data packet, i.e. the MAC1 and the virtual port may be the virtual port 1, which may be configured to receive the data packet.

When the gateway receives the data packet via the virtual port 1 and determines that the virtual port 1 is associated with the VLAN1, the gateway may remove the VLAN ID carried by the data packet.

The gateway may search for the virtual port in the MAC address forwarding entry according to the destination MAC address of the data packet and forward the data packet carrying the VLAN ID corresponding to the virtual port via the virtual port.

At block 411, the access switch 2 may search for a local FT. If the FT is found, the access switch 2 may forward the data packet to the server 2 according to the FT. The server 2 may forward the data packet to the VM2 via a port belonging to the VLAN2. If the FT is not found, the access switch 2 may send the data packet to the control device and the control device may send the FT to the access switch 2.

The migration processing of the VM on the server may be described hereinafter.

When VM4 on the server 2 migrates to the server 1, an ARP entry stored in the VM4 may be kept unchanged.

When the VM4 sends the data packet, if an MAC address of a destination end is stored at local, the VM4 may send the data packet according to the MAC address of the destination end. If the MAC address of the destination end is not stored at local, the VM4 may send an ARP request to request the MAC address of the destination end.

The process for the migrated VM to send the packet may be similar to that described in FIGS. 3 and 4.

Figure 5:
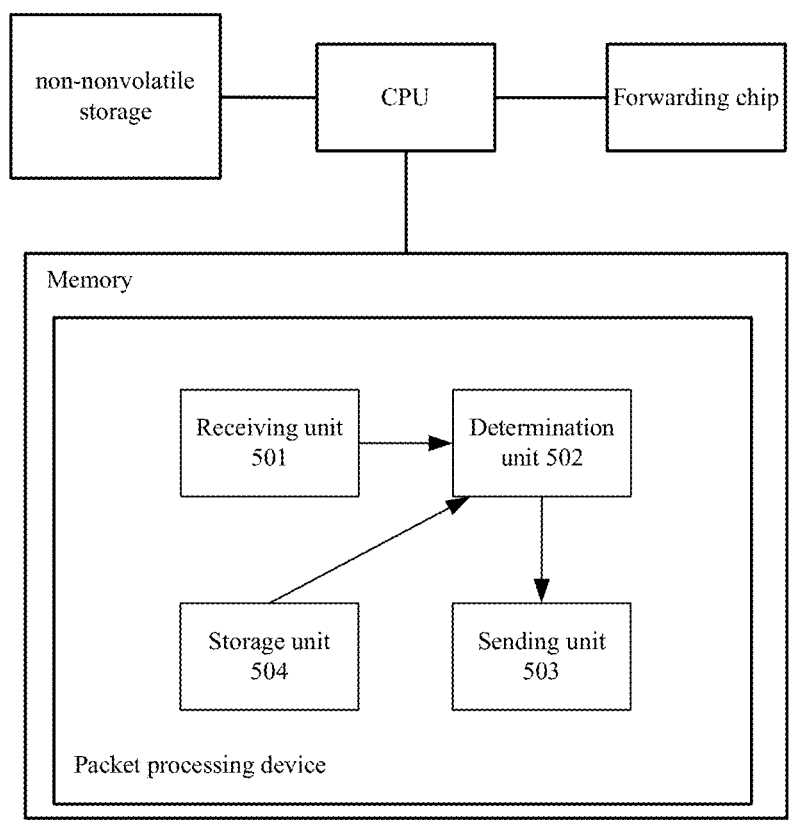
FIG. 5 is a diagram illustrating hardware structure a control device including a packet processing device in accordance with various examples of the present disclosure.

The control device in various examples of the present disclosure may be a programmable device equipped with a non-transitory storage medium, such as a hard disk or memory and machine readable instructions stored in the non-transitory storage medium. Referring to FIG. 5, FIG. 5 is a diagram illustrating an example hardware structure of a control device including a packet processing device in accordance with various examples of the present disclosure. The control device may include: a storage, such as a non-nonvolatile storage, processor, such as a CPU, a forwarding chip and a memory.

The memory may store machine readable instructions that when executed by a processor implement the functions of a packet processing device. The machine readable instructions, or packet processing device, applied to the control device may include: a receiving unit 501, a determination unit 502 and a sending unit 503.

The receiving unit 501 may be configured to receive a packet from an access switch.

The determination unit 502 may be configured to make a determination as to whether VM address information in the packet received by the receiving unit 501 is associated with a port on the access switch for receiving the packet.

The sending unit 503 may be configured to send an instruction to the access switch instructing the access switch to associate the VM address information in the packet with the port on the access switch for receiving the packet if the determination unit 502 determines that the VM address information in the packet is not associated with a port on the access switch for receiving the packet, so that the access switch associates the VM address information in the packet with the port on the access switch for receiving the packet. The VM address information may include: a Virtual Local Area Network Identity (VLAN ID), an Internet Protocol (IP) address and a Media Access Control (MAC) address.

In an example of the present disclosure, the access switch may respectively associate the VM address information with an ingress port of the port on the access switch for receiving the packet and associate the VM address information with an egress port of the port.

Further, the packet processing device may further include a storage unit 504.

The storage unit 504 may be configured to store VM address information of each VM and associate and store a VLAN ID, IP address and MAC address of the each VM. The VLAN ID of the each VM may be unique.

The determination unit 502 may be further configured to make a determination as to whether the VM address information of the each VM stored in the storage unit 504 includes the VM address information in the packet before the sending unit 503 sends the instruction to the access switch instructing the access switch to associate the VM address information in the packet with the port on the access switch for receiving the packet.

The sending unit 503 may be further configured to send the instruction to the access switch instructing the access switch to associate the VM address information in the packet with the port on the access switch for receiving the packet if the determination unit 502 determines that the stored VM address information of the each VM includes the VM address information in the packet and send an instruction to the access switch instructing the access switch not to receive the packet if the determination unit 502 determines that the stored VM address information of the each VM does not include the VM address information in the packet, so that the access switch discards the packet.

The sending unit 503 may be further configured to send a Flow Table (FT) to the access switch if the packet received by the receiving unit 501 is a data packet, so that the access switch forwards the data packet to a gateway according to the FT, notify the gateway of creating a sub-VLAN on a physical port. A VLAN ID of the sub-VLAN may be same as the VLAN ID in the data packet. The sending unit 503 may be further configured to send a primary VLAN ID, the VLAN ID of the sub-VLAN and a source MAC address of the data packet to the gateway, so that the gateway creates an MAC address forwarding entry according to the primary VLAN ID, the VLAN ID of the sub-VLAN and the source MAC address of the data packet, receives the data packet and forwards the data packet according to the MAC address forwarding entry.

The determination unit 502 may be further configured to make a determination as to whether the gateway has created a first sub-VLAN, a VLAN ID of which is same as the VLAN ID in the VM address information in the packet, on the physical port.

The sending unit 503 may be further configured to notify the gateway of deleting the first sub-VLAN if the determination unit 502 determines that the gateway has created the first sub-VLAN, so that the gateway may delete the first sub-VLAN created on the physical port.

The sending unit 503 may be further configured to send a Flow Table (FT) to the access switch if the packet received by the receiving unit 501 is a data packet, so that the access switch may forward the data packet to a gateway according to the FT. The sending unit 503 may be further configured to notify the gateway of creating a virtual port on a physical port, send the virtual port and the VLAN ID in the data packet to the gateway, so that the gateway may remove a VLAN ID of the data packet on the virtual port. The sending unit 503 may be further configured to send the virtual port, a Virtual Network Interface (VNI) and a source MAC address of the data packet to the gateway, so that the gateway may create an MAC address forwarding entry according to the virtual port, VNI and source MAC address of the data packet, receive the data packet and forward the data packet according to the MAC address forwarding entry. The virtual port may be the virtual port created on the physical port and VNI may be a VNI, to which the virtual port belongs.

The determination unit 502 may be further configured to make a determination as to whether the gateway has created a first virtual port corresponding to the VLAN ID in the VM address information on the physical port.

The sending unit 503 may be further configured to notify the gateway of deleting the first virtual port if the determination unit 502 determines that the gateway has created the first virtual port, so that the gateway may delete the first virtual port created on the physical port.

The determination unit 502 may be further configured to make a determination as to whether the VM address information in the packet has been associated with a first port if the VM address information in the packet is not associated with the port on the access switch for receiving the packet.

The sending unit 503 may be further configured to notify a first access device, to which the first port associated with the VM address information in the packet belongs, of deleting the VM address information associated with the first port if the determination unit 502 determines that the VM address information has been associated with the first port, so that the first access switch may delete the VM address information associated with the first port.

According to various examples of the present disclosure, the receiving unit 501, determination unit 502, sending unit 503 and storage unit 504 may be programs, e.g., sets of machine readable instructions, stored in a memory. In another example, the receiving unit 501, determination unit 502, sending unit 503 and storage unit 504 may be hardware modules on a hardware device. In a further example, the receiving unit 501, determination unit 502, sending unit 503 and storage unit 504 may include a combination of programs and hardware modules.

The non-nonvolatile storage is configured to store machine readable instructions, which may be executed by the CPU to implement the function of the packet processing device in the memory.

The CPU may be configured to communicate with the forwarding chip, receive and transmit the packet. The CPU may be further configured to communicate with the non-nonvolatile storage, read and execute the machine readable instructions in the non-nonvolatile storage to implement functions of the receiving unit 501, determination unit 502, sending unit 503 and storage unit 504 in the packet processing device and process the packet from the forwarding chip.

The forwarding chip may be configured to connect to the access switch and the gateway via ports on the forwarding chip, receive, transmit and process the packet, send instructions and FT from the CPU to the access switch and send the packet from the access switch to the CPU.

The memory may cooperate with the CPU to instantiate the machine readable instructions to form the receiving unit 501, determination unit 502, sending unit 503 and storage unit 504, run the machine readable instructions in the non-nonvolatile storage to implement the functions of the receiving unit 501, determination unit 502, sending unit 503 and storage unit 504.

The above packet processing device may be a logical device and may be formed by reading the machine readable instructions by the CPU from the non-nonvolatile storage into the memory. When the machine readable instructions are executed, the packet processing device may execute the above operations according to the above methods.

The above units in the above examples may be integrated together or separately deployed. These units may be combined into one unit or split into multiple sub-units.

According to various examples of the present disclosure, when the control device receives the packet from the VM via the access switch, the control device may obtain the access location of each VM on the server according to the stored corresponding relationship between the MAC address, IP address and VLAN ID.

What is claimed is:

1. A packet processing method, comprising:
receiving, by a control device, a packet from a first port on a first access switch;
  determining, by the control device, whether local Virtual Machine (VM) address information comprises VM address information in the received packet;
  in response to determining that the local VM address information does not comprise the VM address information in the packet, sending an instruction to the first access switch instructing the first access switch to discard the packet, wherein the VM address information comprises a Virtual Local Area Network Identity (VLAN ID), an Internet Protocol (IP) address and a Media Access Control (MAC) address, and wherein a VLAN ID of each VM in the local VM address information is unique;
  in response to determining that the local VM address information comprises the VM address information in the packet, determining whether the VM address information in the packet is associated with the first port on the first access switch;
  in response to determining that the VM address information in the packet is not associated with the first port on the first access switch, sending, by the control device, an instruction to the first access switch instructing the first access switch to associate the VM address information with the first port on the first access switch, so that the first access switch associates the VM address information with the first port on the first access switch for receiving the packet;
  in response to determining that the VM address information in the packet is previously associated with a second port on a second access switch, sending, by the control device, an instruction to the second access switch instructing the second access switch to delete a corresponding association between the VM address information and the second port on the second access switch; and
  updating, at the control device, a local record to indicate an association between the VM address information and the first port on the first access switch;
  wherein, if the packet received by the control device is a data packet, the control device is further configured to:
    send a Flow Table (FT) to the first access switch, so that the first access switch forwards the data packet to a gateway according to the FT;
    notify the gateway of creating a virtual port on a physical port of the gateway;
    send the virtual port and the VLAN ID in the data packet to the gateway, so that the gateway removes a VLAN of the data packet on the virtual port;
    send the virtual port, a Virtual Network Interface (VNI) and a source MAC address of the data packet to the gateway, so that the gateway creates an MAC address forwarding entry according to the virtual port, VNI and source MAC address of the data packet, receives the data packet and forwards the data packet according to the MAC address forwarding entry; wherein the VNI is a VNI, to which the virtual port belongs; and
    if the gateway has created a first virtual port corresponding to the VLAN ID in the VM address information, notify the gateway of deleting the first virtual port.

2. The method according to claim 1, further comprising:
if the packet received by the control device is a data packet, sending, by the control device, a Flow Table (FT) to the first access switch, so that the first access switch forwards the data packet to a gateway according to the FT;
notifying, by the control device, the gateway of creating a sub-VLAN on a physical port; wherein a VLAN ID of the sub-VLAN is same as the VLAN ID in the data packet;
sending, by the control device, a primary VLAN ID, the VLAN ID of the sub-VLAN and a source MAC address of the data packet to the gateway, so that the gateway creates an MAC address forwarding entry according to the primary VLAN ID, the VLAN ID of the sub-VLAN and the source MAC address of the data packet, receives the data packet and forwards the data packet according to the MAC address forwarding entry.

3. The method according to claim 2, further comprising:
if the gateway has created a first sub-VLAN, a VLAN ID of which is same as the VLAN ID in the VM address information in the packet, notifying, by the control device, the gateway of deleting the first sub-VLAN, so that the gateway deletes the first sub-VLAN created for the physical port.

4. A control device, comprising:
a storage and a processor;
wherein the processor is to execute machine readable instructions in the storage to:
  receive a packet from a first port on a first access switch;
  determine whether local Virtual Machine (VM) address information comprises VM address information in the received packet;
  in response to determining that the local VM address information does not comprise the VM address information in the packet, send an instruction to the first access switch instructing the first access switch to discard the packet, wherein the VM address information comprises a Virtual Local Area Network Identity (VLAN ID), an Internet Protocol (IP) address and a Media Access Control (MAC) address, and wherein a VLAN ID of each VM in the local VM address information is unique;
  in response to determining that the local VM address information comprises the VM address information in the packet, determine whether the VM address information in the packet is associated with the first port on the first access switch;
in response to determining that the VM address information in the packet is not associated with the first port on the first access switch, send an instruction to the first access switch instructing the first access switch to associate the VM address information with the first port on the first access switch, so that the first access switch associates the VM address information in the packet with the first port on the first access switch;
  in response to determining that the VM address information in the packet is previously associated with a second port on a second access switch, send an instruction to the second access switch instructing the second access switch to delete a corresponding association between the VM address information and the second port on the second access switch; and update a local record to indicate an association between the VM address information and the first port on the first access switch; wherein, if the received packet is a data packet, the processor is further configured to execute the machine readable instructions in to storage to:

send a Flow Table (FT) to the first access switch, so that the first access switch forwards the data packet to a gateway according to the FT;

notify the gateway of creating a virtual port on a physical port of the gateway;

send the virtual port and the VLAN ID in the data packet to the gateway, so that the gateway removes a VLAN of the data packet on the virtual port;

send the virtual port, a Virtual Network Interface (VNI) and a source MAC address of the data packet to the gateway, so that the gateway creates an MAC address forwarding entry according to the virtual port, VNI and source MAC address of the data packet, receives the data packet and forwards the data packet according to the MAC address forwarding entry; wherein the VNI is a VNI, to which the virtual port belongs; and if the gateway has created a first virtual port corresponding to the VLAN ID in the VM address information, notify the gateway of deleting the first virtual port.

5. The device according to claim 4, wherein the processor is further to execute the machine readable instructions in the storage, to if the received packet is a data packet, send a Flow Table (FT) to the first access switch, so that the first access switch forwards the data packet to a gateway according to the FT;

notify the gateway of creating a sub-VLAN on a physical port; wherein a VLAN ID of the sub-VLAN is same as the VLAN ID in the data packet;

send a primary VLAN ID, the VLAN ID of the sub-VLAN and a source MAC address of the data packet to the gateway, so that the gateway creates an MAC address forwarding entry according to the primary VLAN ID, the VLAN ID of the sub-VLAN and the source MAC address of the data packet, receives the data packet and forwards the data packet according to the MAC address forwarding entry.

6. The device according to claim 5, wherein the processor is further to execute the machine readable instructions in the storage, to make a determination as to whether the gateway has created a first sub-VLAN, a VLAN ID of which is same as the VLAN ID in the VM address information in the packet, on the physical port;

if the gateway has created the first sub-VLAN, notify the gateway of deleting the first sub-VLAN, so that the gateway deletes the first sub-VLAN created on the physical port.

7. A non-transitory computer-readable storage device storing instructions that when executed by a computer cause the computer to perform a method for processing a packet, the method comprising:

receiving, by a control device, a packet from a first port on a first access switch;

determining, by the control device, whether local Virtual Machine (VM) address information comprises VM address information in the received packet;

in response to determining that the local VM address information does not comprise the VM address information in the packet, sending an instruction to the first access switch instructing the first access switch to discard the packet, wherein the VM address information comprises a Virtual Local Area Network Identity (VLAN ID), an Internet Protocol (IP) address and a Media Access Control (MAC) address, and wherein a VLAN ID of each VM in the local VM address information is unique;

in response to determining that the local VM address information comprises the VM address information in the packet, determining whether the VM address information in the packet is associated with the first port on the first access switch;

in response to determining that the VM address information in the packet is not associated with the first port on the first access switch, sending, by the control device, an instruction to the first access switch instructing the first access switch to associate the VM address information with the first port on the first access switch, so that the first access switch associates the VM address information with the first port on the first access switch for receiving the packet;

in response to determining that the VM address information in the packet is previously associated with a second port on a second access switch, sending, by the control device, an instruction to the second access switch instructing the second access switch to delete a corresponding association between the VM address information and the second port on the second access switch; and updating, at the control device, a local record to indicate an association between the VM address information and the first port on the first access switch;

wherein, if the received packet is a data packet, the method further comprises:

sending a Flow Table (FT) to the first access switch, so that the first access switch forwards the data packet to a gateway according to the FT;

notifying the gateway of creating a virtual port on a physical port of the gateway;

sending the virtual port and the VLAN ID in the data packet to the gateway, so that the gateway removes a VLAN of the data packet on the virtual port;

sending the virtual port, a Virtual Network Interface (VNI) and a source MAC address of the data packet to the gateway, so that the gateway creates an MAC address forwarding entry according to the virtual port, VNI and source MAC address of the data packet, receives the data packet and forwards the data packet according to the MAC address forwarding entry; wherein the VNI is a VNI, to which the virtual port belongs; and if the gateway has created a first virtual port corresponding to the VLAN ID in the VM address information, notifying the gateway of deleting the first virtual port.

8. The non-transitory computer-readable storage device of claim 7, wherein the method comprises:

if the packet received by the control device is a data packet, sending, by the control device, a Flow Table (FT) to the first access switch, so that the first access switch forwards the data packet to a gateway according to the FT;

notifying, by the control device, the gateway of creating a sub-VLAN on a physical port; wherein a VLAN ID of the sub-VLAN is same as the VLAN ID in the data packet;

sending, by the control device, a primary VLAN ID, the VLAN ID of the sub-VLAN and a source MAC address of the data packet to the gateway, so that the gateway creates an MAC address forwarding entry according to the primary VLAN ID, the VLAN ID of the sub-VLAN and the source MAC address of the data packet, receives the data packet and forwards the data packet according to the MAC address forwarding entry.

9. The non-transitory computer-readable storage device of claim 8, wherein the method further comprises:

if the gateway has created a first sub-VLAN, a VLAN ID of which is same as the VLAN ID in the VM address information in the packet, notifying, by the control device, the gateway of deleting the first sub-VLAN, so that the gateway deletes the first sub-VLAN created for the physical port.

* * * * *